United States Patent
Patil et al.

(10) Patent No.: US 10,924,480 B2
(45) Date of Patent: Feb. 16, 2021

(54) EXTENDED TRUST FOR ONBOARDING

(71) Applicant: Cisco Technology, Inc., San Jose, CA (US)

(72) Inventors: Santosh Ramrao Patil, Santa Clara, CA (US); Gangadharan Byju Pularikkal, San Jose, CA (US); Sourav Chakraborty, Fremont, CA (US); Madhusudan Nanjanagud, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 410 days.

(21) Appl. No.: 15/907,297

(22) Filed: Feb. 28, 2018

(65) Prior Publication Data
US 2019/0268338 A1     Aug. 29, 2019

(51) Int. Cl.
H04L 29/06     (2006.01)

(52) U.S. Cl.
CPC ...... *H04L 63/0884* (2013.01); *H04L 63/0428* (2013.01); *H04L 63/0853* (2013.01); *H04L 63/0876* (2013.01)

(58) Field of Classification Search
CPC ............ H04L 63/0428; H04L 63/0853; H04L 63/0876; H04L 63/0884; H04L 63/12; H04L 63/126; H04W 4/50; H04W 4/70; H04W 12/00512; H04W 12/06
See application file for complete search history.

(56) References Cited

U.S. PATENT DOCUMENTS

| | | | | |
|---|---|---|---|---|
| 9,680,873 | B1* | 6/2017 | Halls | H04L 63/0869 |
| 9,911,290 | B1* | 3/2018 | Zalewski | G06Q 30/0633 |
| 10,499,246 | B2* | 12/2019 | Li | H04L 63/1466 |
| 2014/0126419 | A1* | 5/2014 | Boland | H04W 8/005 370/254 |
| 2014/0245403 | A1* | 8/2014 | Li | H04L 63/08 726/4 |

(Continued)

OTHER PUBLICATIONS

Intel, Intel Offers Innovative Approach to IOT Scaling and Security (Oct. 3, 2017).

(Continued)

*Primary Examiner* — Eric W Shepperd
(74) *Attorney, Agent, or Firm* — Behmke Innovation Group LLC; James M. Behmke; James J. Wong (57) ABSTRACT

In one embodiment, an IoT server includes: processing circuitry, an I/O module operative to communicate with at least an IoT device and a vendor network server, and an onboarding application and operative to at least: receive an onboarding request from the IoT device via the I/O module, send a confirmation request to the vendor network server via the I/O module, where the confirmation request indicates a request to confirm an identity of the IoT device according to a connection to a network device authenticated by the vendor network server, receive a confirmation response from the vendor network server via the I/O module, where the confirmation response indicates whether the IoT device is connected to the network device, and if the confirmation response is a positive confirmation response that indicates that the IoT device is connected to the network device, onboard the IoT device for participation in an IoT-based system.

20 Claims, 4 Drawing Sheets

(56) References Cited

U.S. PATENT DOCUMENTS

| | | | |
|---|---|---|---|
| 2014/0289528 A1* | 9/2014 | Baghdasaryan | G06Q 20/425 713/171 |
| 2014/0289833 A1* | 9/2014 | Briceno | H04L 63/08 726/7 |
| 2015/0023183 A1* | 1/2015 | Ilsar | H04W 48/16 370/244 |
| 2015/0121470 A1 | 4/2015 | Rongo et al. | |
| 2015/0262443 A1* | 9/2015 | Chong | G08C 17/02 340/5.71 |
| 2016/0036819 A1 | 2/2016 | Zehavi et al. | |
| 2016/0037436 A1 | 2/2016 | Spencer et al. | |
| 2016/0134419 A1 | 5/2016 | Smith et al. | |
| 2016/0212099 A1 | 7/2016 | Zou et al. | |
| 2017/0006595 A1* | 1/2017 | Zakaria | H04L 67/12 |
| 2017/0171196 A1* | 6/2017 | Britt | H04L 63/061 |
| 2017/0171204 A1* | 6/2017 | Forood | H04W 4/00 |
| 2017/0279620 A1* | 9/2017 | Kravitz | H04L 9/3268 |
| 2017/0346848 A1 | 11/2017 | Smith et al. | |
| 2018/0054327 A1* | 2/2018 | Ameling | H04L 67/12 |
| 2018/0063079 A1* | 3/2018 | Ding | H04L 12/2854 |
| 2018/0091506 A1* | 3/2018 | Chow | G06Q 20/145 |
| 2018/0263071 A1* | 9/2018 | Yoon | H04W 76/18 |
| 2018/0270137 A1* | 9/2018 | Ganster | H04L 12/2818 |
| 2019/0064929 A1* | 2/2019 | Tomeh | H04L 12/2803 |
| 2019/0123967 A1* | 4/2019 | Dotchkoff | H04W 4/50 |
| 2019/0124507 A1* | 4/2019 | Dotchkoff | H04W 4/70 |
| 2019/0149530 A1* | 5/2019 | Ma | H04W 4/70 726/3 |
| 2019/0297007 A1* | 9/2019 | Lessmann | H04L 45/38 |
| 2019/0364023 A1* | 11/2019 | Marquardt | G06F 21/74 |
| 2020/0067938 A1* | 2/2020 | Smith | G06F 9/5072 |
| 2020/0076815 A1* | 3/2020 | Smith | H04W 12/08 |
| 2020/0186998 A1* | 6/2020 | Smith | H04W 4/70 |

OTHER PUBLICATIONS

Wikipedia, Cisco Discovery Protocol (2018) Can be seen at: https://en.wikipedia.org/w/index.php?title=Cisco_Discovery_Protocol&oldid=779112658.

* cited by examiner

EXTENDED TRUST FOR ONBOARDING

TECHNICAL FIELD

The present disclosure generally relates to onboarding devices that are not configured with a secure trust mechanism.

BACKGROUND

Internet of Things (IoT) devices are typically managed by a cloud-based server. When an IoT device is initially deployed, it communicates with the cloud-based server to initiate an onboarding process in which the IoT device registers with the cloud-based server and is provisioned to provide its intended functionality. As a security measure, the IoT device and the cloud-based server mutually authenticate each other during the onboarding process.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Overview

An Internet of Things (IoT) server includes: processing circuitry, an input/output (I/O) module operative to communicate with at least an IoT device and a vendor network server, and an onboarding application to be executed by the processing circuitry and operative to at least: receive an onboarding request from the IoT device via the I/O module, send a confirmation request to the vendor network server via the I/O module, where the confirmation request indicates a request to confirm an identity of the IoT device by confirming that the IoT device is connected to a network device authenticated by the vendor network server, receive a confirmation response from the vendor network server via the I/O module, where the confirmation response indicates whether the IoT device is connected to the network device, and upon determining that the confirmation response is a positive confirmation response that indicates that the IoT device is connected to the network device, onboard the IoT device for participation in an IoT-based system.

A vendor network server includes: processing circuitry, an input/output (I/O) module operative to communicate with at least a network device and an IoT server, and an IoT device verifier instantiated in memory to be executed by the processing circuitry and operative to at least: receive a confirmation request from the IoT server via the I/O module, where the confirmation request comprises at least an indication of an IoT device and at least an indication of the network device, poll the network device via the I/O module to confirm that the IoT device is connected to the network device, and send a confirmation message via the I/O module to the IoT server, where the confirmation message indicates either a positive confirmation or a negative confirmation according to the poll of the network device.

DETAILED DESCRIPTION OF EXAMPLE EMBODIMENTS

IoT devices are typically resource constrained entities. As such, they are typically not configured with secure trust mechanisms such as SUDI (secure unique device identification), X.509 compliant device certificates, and the ACT-2 chipset available from Cisco Inc. which is used for securely storing device certificates and critical information in hardware.

However, such secure trust mechanisms are typically available with upstream switches or routers to which IoT devices are connected for access to the cloud-based servers via the Internet. In accordance with embodiments described herein, the secure trust mechanisms on upstream switches and/or routers may be leveraged to extend trust to connected IoT devices for authentication during the onboarding process. For example, a vendor providing a cloud network infrastructure may use secure trust mechanisms when onboarding the switches and/or routers to which IoT devices may connect in order to communicate with a cloud-based onboarding server. Given that a secure trust mechanism on a switch/router provides trust vis-a-vis the cloud network for the switch/router, the cloud-based onboarding server may be operative to extend that trust to an IoT device connected to the switch/router.

Figure 1:
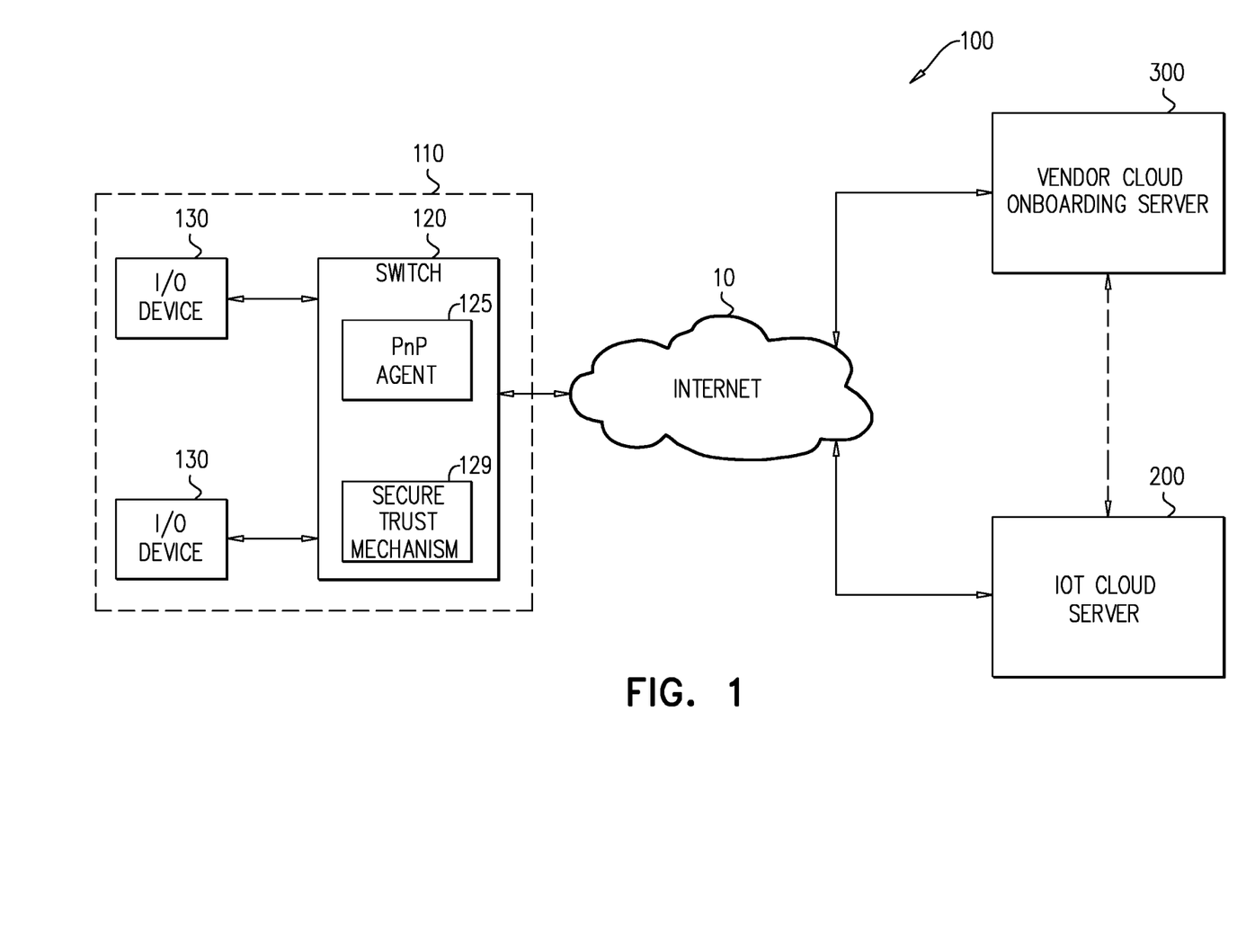
FIG. 1 is a partly-pictorial, partly-block diagram illustration of an exemplary extended trust onboarding system, constructed and operative in accordance with embodiments described herein.

Reference is now made to FIG. 1 which is an illustration of an exemplary extended trust onboarding system 100, constructed and operative in accordance with embodiments described herein. System 100 comprises site 110, IoT cloud server 200 (also referred to hereinafter as "server 200") and vendor cloud onboarding server 300 (also referred to hereinafter as "server 300"). Site 110 comprises switch 120 and a multiplicity of IoT devices 130. IoT devices 130 may access Internet 10 via a direct or indirect connection to switch 120. It will be appreciated that IoT devices 130 may connect to switch 120 via a wired connection, a wireless connection, and/or a combination thereof. It will also be appreciated that in some embodiments the functionality ascribed herein to switch 120 may be provided instead by a similarly configured router, hub, personal computer or any other suitable networking device that may be connected to IoT devices 130 in site 110.

Switch 120 comprises plug and play (PnP) agent 125 and secure trust mechanism 129. PnP agent 125 may be employed by vendor cloud onboarding server 300 to onboard switch 120 to provide connectivity to a cloud network (not shown) operated by a vendor associated with server 300. Secure trust mechanism 129 may be implemented using any software, firmware, and/or hardware that may be used to provide generally secure authentication of switch 120 while being onboarded by server 300. For example, secure trust mechanism 129 may be implemented as a hardware security module (HSM). An HSM is a physical computing component (e.g., a plug-in card or external device) that safeguards and manages digital keys for strong authentication and provides cryptoprocessing. In accordance with an exemplary embodiment described herein, secure trust mechanism 129 may be implemented using SUDI and/or the ACT-2 chipset. It will be appreciated that the embodiments described herein may support other implementations of secure trust mechanism 129, e.g., using other HSMs such as, for example, Gemalto SafeNet KeySecure or Thales.

IoT devices 130 may be implemented as any suitable IoT device or devices that may be deployed in site 110 such as, for example, lighting units, remote sensors, etc. Upon installation of IoT devices 130, they may communicate (via switch 120 and Internet 10) with IoT cloud server 200 as part of an onboarding process associated with an IoT-based system for providing the functionality for which the devices were deployed, e.g., a system for lighting or security at site 110.

As discussed hereinabove, IoT devices 130 may not be configured with the functionality provided by secure trust mechanism 129. In the embodiment of FIG. 1, switch 120 is configured with secure trust mechanism 129. However, it may not be assumed that IoT cloud server 200 may directly communicate with switch 120 in order to authenticate IoT devices 130; while traffic to/from server 200 may flow through switch 120, server 200 may not be authorized to access secure trust mechanism 129. Accordingly, server 200 may be operative to send a request to vendor cloud onboarding server 300 to access switch 120 in order to authenticate IoT devices 130 connected to switch 120.

In operation, when authenticating opposite IoT cloud server 200, IoT devices 130 may send identifying details for switch 120 to server 200. Server 200 may send the identifying details to vendor cloud onboarding server 300. Server 300 may then communicate with switch 120 to verify that IoT devices 130 are indeed connected as indicated in the authentication process with server 200. It will be appreciated that the communication between server 300 and switch 120 may be predicated on successful authentication of switch 120 using secure trust mechanism 129. Accordingly, if and when server 300 confirms to server 200 that IoT devices 130 are indeed connected to switch 120, server 200 may rely on extended trust from switch 120 to authenticate IoT devices 130.

Figure 2:
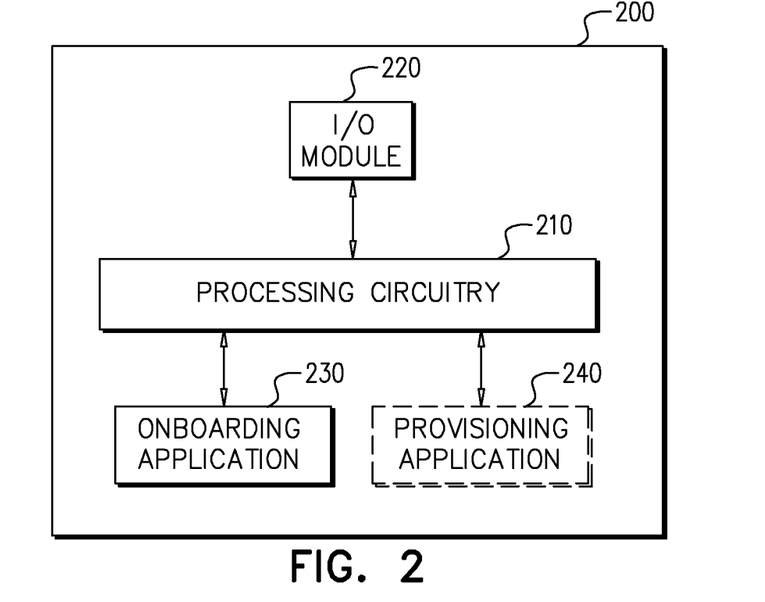
FIG. 2 is a block diagram of an exemplary IoT cloud server from the system of FIG. 1.

Reference is now made also to FIG. 2 which is a block diagram of an exemplary IoT cloud server 200 from system 100 (FIG. 1). IoT cloud server 200 may be implemented on any suitable computing device such as, for example, a computer server or personal computer. IoT cloud server 200 comprises processing circuitry 210, input/output (I/O) module 220, and onboarding application 230. Server 200 may also optionally comprise provisioning application 240. Onboarding application 230 and provisioning application 240 may be implemented using any suitable memory for storing software such as, for example, an optical storage medium, a magnetic storage medium, an electronic storage medium, and/or a combination thereof. It will be appreciated that the memory, or parts thereof, may be implemented as a physical component of server 200 and/or as a physical component of one or more secondary devices in communication with server 200. It will also be appreciated that in the interests of clarity, while server 200 may comprise additional components and/or functionality, such additional components and/or functionality are not depicted in FIG. 2 and/or described herein.

Processing circuitry 210 may be operative to execute instructions stored in memory. For example, processor 210 may be operative to execute onboarding application 230. It will be appreciated that processing circuitry 210 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that IoT cloud server 200 may comprise more than one instance of processing circuitry 210. For example, one such instance of processing circuitry 210 may be a special purpose processor operative to execute onboarding manager 230 to perform some, or all, of the functionality of server 200 as discussed with respect to FIG. 1.

I/O module 220 may be any suitable communications component such as a network interface card, universal serial bus (USB) port, disk reader, modem or transceiver that may be operative to use protocols such as are known in the art to communicate either directly, or indirectly, with other elements of system 100, such as, for example, IoT devices 130, and/or vendor cloud onboarding server 300. For example, I/O module 220 may be operative to use a local area network, a backbone network and/or Internet 10, etc. to connect to the other elements of system 100. It will be appreciated that in operation I/O module 220 may be implemented as a multiplicity of modules, where different modules may be operative to use different communication technologies.

Onboarding application 230 may be an application implemented in hardware, firmware, or software that may be executed by processing circuitry 210 to at least provide the functionality of server 200 as described herein to onboard device 130. Provisioning application 240 may be an application implemented in hardware, firmware, or software that may be executed by processing circuitry 210 to provision IoT devices 130 that have been onboarded by onboarding application 230.

Figure 3:
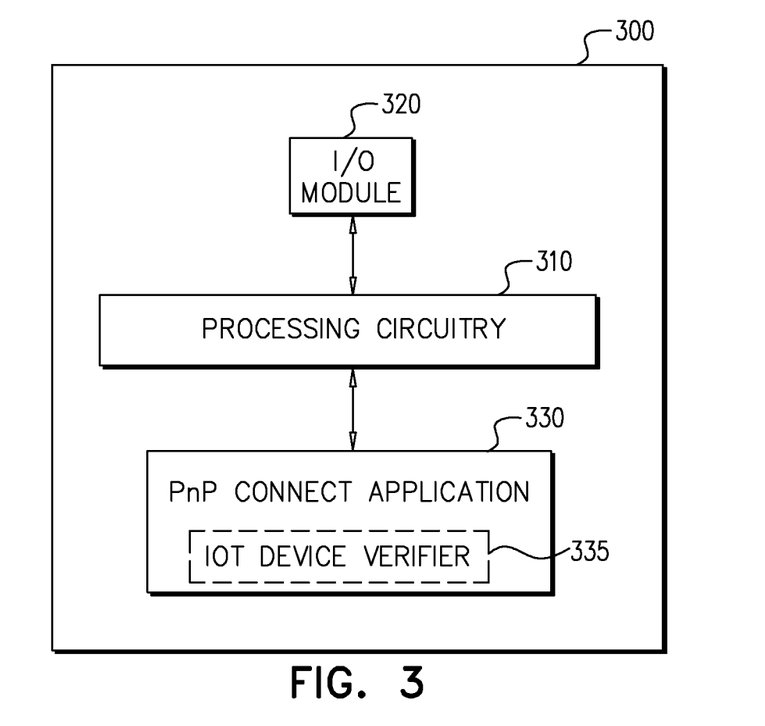
FIG. 3 is a block diagram of an exemplary vendor cloud onboarding server from the system of FIG. 1.

Reference is now made also to FIG. 3 which is a block diagram of an exemplary vendor cloud onboarding server 300 from system 100 (FIG. 1). Server 300 may be implemented on any suitable computing device such as, for example, a computer server or personal computer. Server 300 comprises processing circuitry 310, input/output (I/O) module 320, and PnP connect application 330. PnP connect application 330 may be implemented using any suitable memory for storing software such as, for example, an optical storage medium, a magnetic storage medium, an electronic storage medium, and/or a combination thereof. It will be appreciated that the memory, or parts thereof, may be implemented as a physical component of server 300 and/or as a physical component of one or more secondary devices in communication with server 300. It will also be appreciated that in the interests of clarity, while server 300 may comprise additional components and/or functionality, such additional components and/or functionality are not depicted in FIG. 3 and/or described herein.

Processing circuitry 310 may be operative to execute instructions stored in memory. For example, processor 310 may be operative to execute PnP connect application 330. It will be appreciated that processing circuitry 310 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that server 300 may comprise more than one instance of processing circuitry 310. For example, one such instance of processing circuitry 310 may be a special purpose processor operative to execute PnP connect application 330 to perform some, or all, of the functionality of server 300 as discussed with respect to FIG. 1.

I/O module 320 may be any suitable communications component such as a network interface card, universal serial bus (USB) port, disk reader, modem or transceiver that may be operative to use protocols such as are known in the art to communicate either directly, or indirectly, with other elements of system 100, such as, for example, switch 120 and/or server 200. For example, I/O module 320 may be operative to use a local area network, a backbone network and/or the Internet, etc. to connect to the other elements of system 100. It will be appreciated that in operation I/O module 320 may be implemented as a multiplicity of modules, where different modules may be operative to use different communication technologies.

PnP connect application 330 may be an application implemented in hardware, firmware, or software that may be executed by processing circuitry 310 to at least provide the functionality of server 300 as described herein to configure switch 120 as part of a vendor cloud network and to authenticate IoT devices 130 by extended trust in response to a verification request from server 200.

In accordance with some embodiments described herein, PNP connect application 330 may comprise IoT device verifier 335. IoT device verifier 335 may be a separate module operative to verify the connection of a given IoT device 130 to a given switch in response to a confirmation request from server 200. In other embodiments, the functionality ascribed herein to IoT device verifier 335 may be provided by PnP connect application 330 without a separate module. For ease of reference, the description of the functionality of IoT device verifier 335 is described hereinbelow with respect to an embodiment where PnP connect application 330 is configured with a separate IoT device verifier 335 module. However, it will be appreciated that such description may also apply to functionality integrated as part of PnP connect application 330 without a separate module.

It will be appreciated that the other components of system 100 as depicted in FIG. 1 may also be configured with processing circuitry and I/O modules similar to those described with respect to servers 200 and 300. For example, switch 120 and IoT device 130 may also comprise processing circuitry similar to processing circuitry 210/310, I/O modules similar to I/O module 320, and applications implemented in software, hardware and/or firmware that may be executed by the processing circuitry to provide the functionality described herein with respect to switch 120 and IoT device 130.

Figure 4:
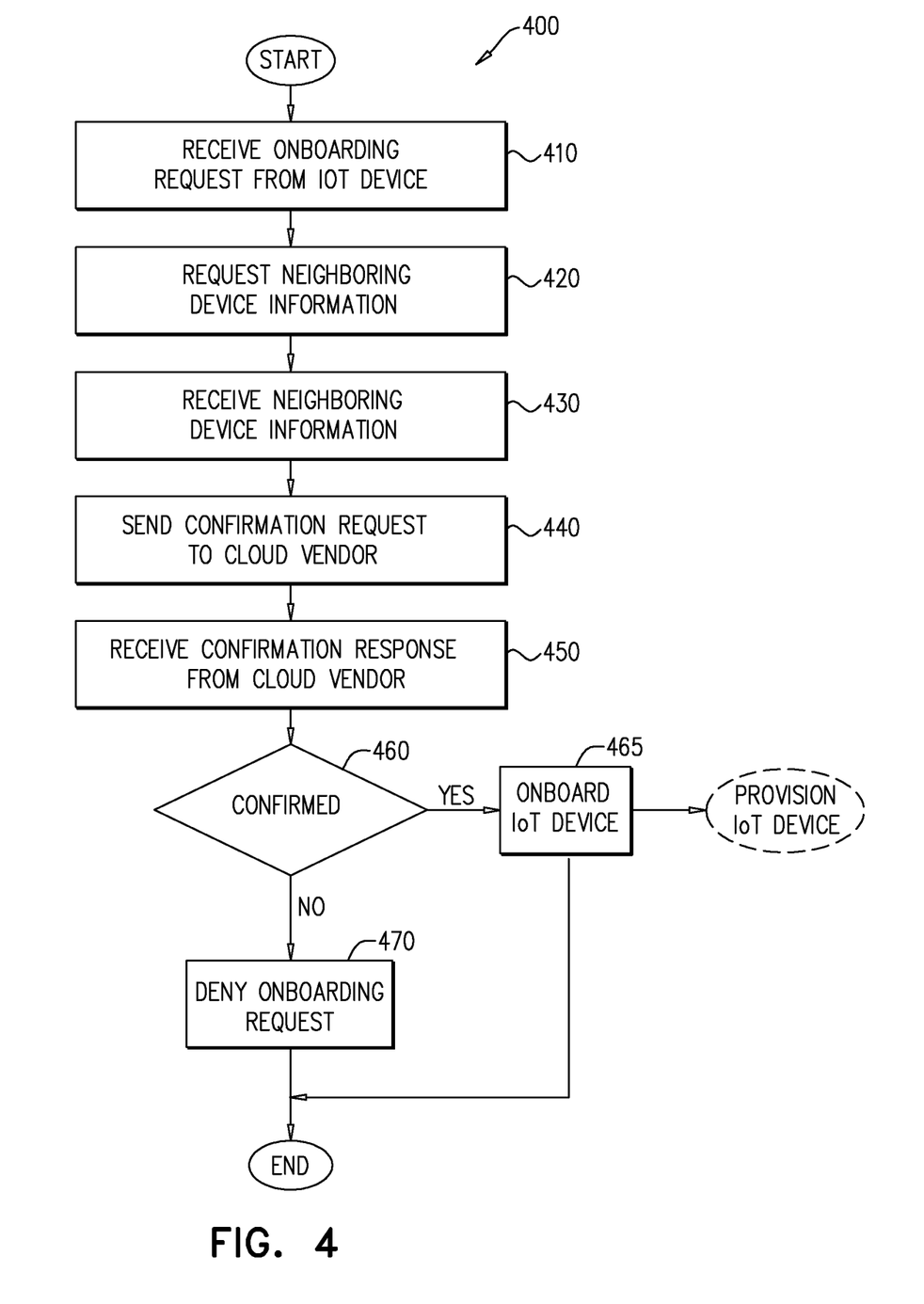
FIG. 4 is a flowchart of an exemplary process to be performed by the IoT cloud server of FIG. 3.

Reference is now made to FIG. 4 which is an illustration of an exemplary onboarding process 400 to be performed by onboarding application 230 on IoT onboarding server 200. For ease of reference, in the following description of process 400, the components of system 100 will be referred to as per their associated reference numerals in FIGS. 1-3.

Onboarding application 230 may receive (step 410) an onboarding request from one of IoT devices 130. The onboarding request may include identifying details associated with the requesting IoT device 130 such as, for example, a serial number, a media access control (MAC) address, and/or vendor details for IoT device 130. It will be appreciated that communications between onboarding application 230 and a requesting IoT device 130 may entail connectivity via a connection between the requesting IoT device 130 and switch 120, and through Internet 10 until received on server 200 by I/O module 220.

In response, onboarding application 230 may request (step 420) neighboring device information from the requesting IoT device 130. Such neighboring device information may include, for example, a serial number, a MAC address, vendor information, etc. of the neighboring device, e.g., switch 120. It will be appreciated that IoT device 130 may use methods known in the art for obtaining the neighboring device information. For example, Cisco Discovery Protocol (CDP) or a similar protocol such as UPnP Discovery or Bonjour discovery.

Onboarding application 230 may receive (step 430) the neighboring device information from the requesting IoT device 130. It will be appreciated that the presentation of steps 410, 420 and 430 as three independent steps in process 400 may be exemplary. In accordance with some embodiments described herein, the onboarding request of step 410 may already include the neighboring device information, thereby rendering steps 420 and 430 unnecessary.

Onboarding application 230 may send (step 440) a confirmation request to vender cloud onboarding server 300 to authenticate the requesting IoT device 130 based on extended trust from switch 120 as described hereinabove. The confirmation request may include the identifying details of the requesting IoT device 130 as well as the neighboring device information for switch 120. It will be appreciated that server 200 may be operative to communicate with more than one server 300; there may be multiple vendors providing cloud network services potentially used by server 200 to onboard IoT devices 130. Onboarding application 230 may identify an appropriate server 300 for step 440 according to the vendor information provided in step 430. It will also be appreciated that communications between onboarding application 230 and server 300 may entail connectivity via I/O modules 220 and 320 through Internet 10.

Onboarding application 230 may receive (step 450) a confirmation response from server 300. If per the confirmation response the identity of the requesting IoT device 130 is confirmed (step 460), onboarding application 230 may onboard (step 465) the requesting IoT device 130. In accordance with some embodiments, provisioning application 240 may be started to provision the requesting IoT device 130. If per the confirmation response the identity of the requesting IoT device 130 is not confirmed (step 460), onboarding application 230 may deny (step 470) the onboarding request.

Figure 5:
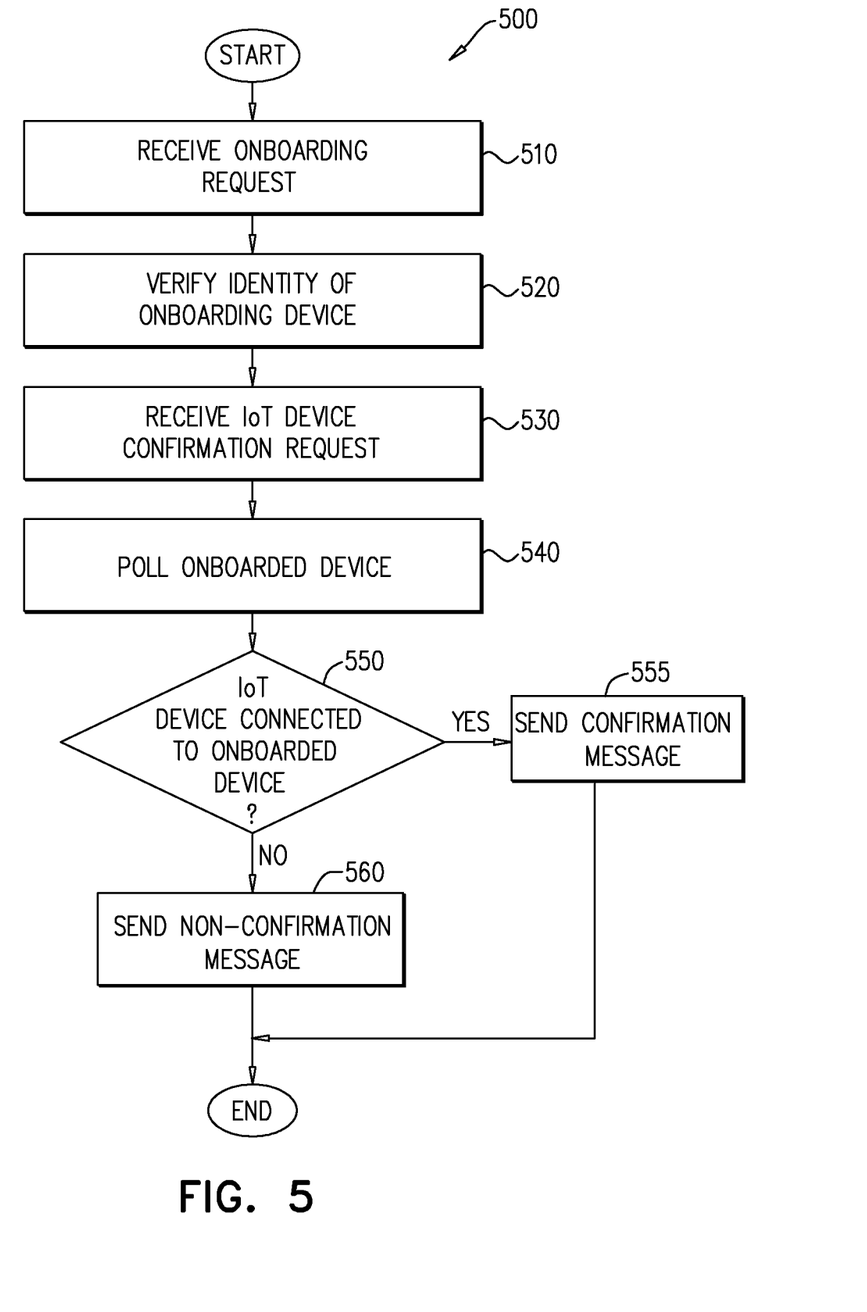
FIG. 5 is a flowchart of an exemplary process to be performed by the vendor cloud onboarding server of FIG. 3.

Reference is now made to FIG. 5 which is an illustration of an exemplary onboarding process 500 to be performed by PnP connect application 330 on vendor cloud onboarding server 300. For ease of reference, in the following description of process 500, the components of system 100 will be referred as per their associated reference numerals in FIGS. 1-3.

PnP connect application 330 may receive (step 510) an onboarding request from switch 120, e.g., when switch 120 is added to the infrastructure of a network associated with server 300. It will be appreciated that the onboarding request may be received via I/O module 320. The onboarding request may include identifying details associated with switch 120 such as, for example, a serial number, or a media access control (MAC) address. It will be appreciated that communications between PnP connect application 330 and PNP agent 125 on requesting switch 120 may entail connectivity between switch 120 and I/O module 320, typically via the Internet 10.

In response, PnP connect application 330 may verify (step 520) the identity of the requesting switch 120. Such verification may be carried out in communication with secure trust mechanism 129 on switch 120 using known methods such as, for example, device authentication based on SUDI and/or the ACT-2 chipset. It will be appreciated that the presentation of steps 510 and 520 as independent steps in process 500 may be exemplary. In accordance with some embodiments described herein, the onboarding request of step 510 and the verification of the requesting device of step 520 may be performed in a single step.

Subsequent to the performance of steps 510 and 520, PnP connect application 330 may receive (step 530) an IoT device confirmation request from server 200. It will be appreciated that the confirmation request received in step 530 may have been sent to server 300 by server 200 in the context of step 440 in process 400. As described with respect to step 440, the confirmation request may include the identifying details of the requesting IoT device 130 as well as the neighboring device information for switch 120.

In response to the confirmation request, PnP connect application 330 may invoke IoT device verifier 335 to use the received identifying details of the requesting IoT device 130 and the neighboring device information to poll (step 540) the onboarded device (e.g., switch 120) to confirm the identifying details in order to authenticate an IoT device 130 by extended trust on behalf of server 200. As described hereinabove, the onboarded device, e.g., switch 120, may use a technology such as, for example, CDP, to confirm the existence of a connected device associated with the identifying details in the confirmation request. It will be appreciated that step 540 may also include authentication of the onboarded device based on SUDI and/or the ACT-2 chipset as described hereinabove.

If, per the results of step 540 the requesting IoT device 130 is connected to the onboarded device (step 550), IoT device verifier 335 sends (step 555) a confirmation message to server 200, effectively providing extended trust from switch 120 to the connected IoT device 130. Otherwise (step 560) a non-confirmation message may be sent indicating that the requesting IoT device 130 is not connected to switch 120. It will be appreciated that the messages of steps 555 and 560 may be received by server 200 in step 450 of process 400. It will be appreciated that once steps 510 and 520 have been performed and switch 120 has been onboarded, steps 530-560 may be performed on an ad hoc basis as different IoT devices 130 attempt to onboard to server 200 via a connection to switch 120.

It will be appreciated that in the interests of network security the operator of switch 120 may not wish to share the "neighboring device information" for a given switch 120 with the operator of server 200. Accordingly, in accordance with some embodiments described herein, switch 120 may encrypt the neighboring device information prior to providing it to IoT device 130. For example, in response step 420 of process 400 (FIG. 4), IoT device 130 may use CDP or a similar protocol to obtain the neighboring device information from switch 120. Switch 120 may be configured to encrypt the neighboring device information prior to providing it to IoT device 130. For example, secure trust mechanism 129 may be operative to use a manufacturing time certificate stored in an ACT-2 chipset or a similar tamper resistant hardware chip to encrypt the neighboring device information prior to providing it to IoT device 130. Accordingly, in step 430 of process 400, server 200 may receive encrypted neighboring device information. It will be appreciated that even though the operator of server 200 may lack a key for decrypting the encrypted neighboring device information, server 300 may have such a key. For example, IoT device verifier 335 may be operative to use such a key to decrypt encrypted neighboring device information. Accordingly, the encrypted neighboring device information may be provided to (and forwarded by) server 200 without exposing the actual information and without impacting the functionality of the embodiments described herein.

It will be appreciated that system 100 and processes 400 and 500 may not be limited to just onboarding scenarios. System 100 and processes 400 and 500 may also be adapted to provide extended trust for other embodiments entailing authentication of IoT devices 120, e.g. where IoT devices 120 are authenticated for further communication such as, for example, an IoT device 120 to IoT management system communication for configuration management, IoT device 120 to data analytics system communication for collecting data from IoT devices 120 for further processing, etc.

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

It will be appreciated by persons skilled in the art that the embodiments of the disclosure are not limited by what has been particularly shown and described hereinabove. Rather the scope of the embodiments of the disclosure is defined by the appended claims and equivalents thereof:

What is claimed is:

1. An Internet of Things (IoT) server that provides services of an IoT-based system for a plurality of IoT devices, comprising:
processing circuitry;
an input/output (I/O) module operative to communicate with at least an IoT device of the plurality of IoT devices and a vendor network server; and
an onboarding application to be executed by the processing circuitry and operative to at least:
receive an onboarding request from the IoT device via the I/O module,
send a confirmation request to the vendor network server via the I/O module, wherein the confirmation request indicates a request to confirm an identity of the IoT device by confirming that the IoT device is connected to a network device authenticated by the vendor network server, wherein the network device comprises a router or switch that has a secure trust mechanism installed,
receive a confirmation response from the vendor network server via the I/O module, wherein the confirmation response indicates whether the IoT device is connected to the network device and is based on a successful authentication of the network device with the vendor network server using the secure trust mechanism, and
upon determining that the confirmation response is a positive confirmation response that indicates the IoT device is connected to the network device, onboard the IoT device for participation in the IoT-based system.

2. The IoT server according to claim 1 and further comprising a provisioning application to be executed by the processing circuitry and operative to provision the IoT device in response to the positive confirmation response.

3. The IoT server according to claim 1 wherein the confirmation request comprises identifying details for the IoT device, wherein the identifying details comprise at least one of a serial number, a media access control (MAC) address, or associated vendor information.

4. The IoT server according to claim 1 wherein the confirmation request comprises neighboring device information for the network device, wherein the neighboring device information comprises at least one of a serial number, a media access control (MAC) address, or associated vendor information.

5. The IoT server according to claim 4 wherein the onboarding application is further operative to:
   send a neighboring device information request via the I/O module to the IoT device, wherein the neighboring device information request is a request for the IoT device to provide the neighboring device information for a neighboring network device to which the IoT device is connected, and
   receive the neighboring device information from the IoT device via the I/O module.

6. The IoT server according to claim 5 wherein the neighboring device information is received from the IoT device in encrypted form, and the neighboring device information is included in the confirmation request in the encrypted form.

7. The IoT server according to claim 1 wherein the IoT device is not configured with a hardware security mechanism for device authentication.

8. The IoT server according to claim 1 wherein the IoT device is configured with a hardware security mechanism for device authentication.

9. A method, comprising:
   receiving, by an onboarding application of an Internet of Things (IoT) server that provides services of an IoT-based system for a plurality of IoT devices, an onboarding request from an IoT device,
   sending, by the onboarding application, a confirmation request to a vendor network server, wherein the confirmation request indicates a request to confirm an identity of the IoT device by confirming that the IoT device is connected to a network device authenticated by the vendor network server, wherein the network device comprises a router or switch that has a secure trust mechanism installed,
   receive, by the onboarding application, a confirmation response from the vendor network server, wherein the confirmation response indicates whether the IoT device is connected to the network device and is based on a successful authentication of the network device with the vendor network server using the secure trust mechanism, and
   onboard, by the onboarding application and upon determining that the confirmation response is a positive confirmation response that indicates the IoT device is connected to the network device, the IoT device for participation in the IoT-based system.

10. The method as in claim 9, further comprising:
    provisioning, by a provisioning application of the IoT server, the IoT device in response to the positive confirmation response.

11. The method as in claim 9, wherein the confirmation request comprises identifying details for the IoT device, wherein the identifying details comprise at least one of a serial number, a media access control (MAC) address, or associated vendor information.

12. The method as in claim 9, wherein the confirmation request comprises neighboring device information for the network device, wherein the neighboring device information comprises at least one of a serial number, a media access control (MAC) address, or associated vendor information.

13. The method as in claim 12, further comprising:
    sending, by the onboarding application, a neighboring device information request to the IoT device, wherein the neighboring device information request is a request for the IoT device to provide the neighboring device information for a neighboring network device to which the IoT device is connected, and
    receiving, by the onboarding application, the neighboring device information from the IoT device.

14. The method as in claim 13, wherein the neighboring device information is received from the IoT device in encrypted form, and the neighboring device information is included in the confirmation request in the encrypted form.

15. The method as in claim 9, wherein the IoT device is not configured with a hardware security mechanism for device authentication.

16. The method as in claim 9, wherein the IoT device is configured with a hardware security mechanism for device authentication.

17. A tangible, non-transitory, computer-readable medium storing program instructions that cause a security service to execute a process comprising:
    receiving, by an onboarding application of an Internet of Things (IoT) server that provides services of an IoT-based system for a plurality of IoT devices, an onboarding request from an IoT device,
    sending, by the onboarding application, a confirmation request to a vendor network server, wherein the confirmation request indicates a request to confirm an identity of the IoT device by confirming that the IoT device is connected to a network device authenticated by the vendor network server, wherein the network device comprises a router or switch that has a secure trust mechanism installed,
    receive, by the onboarding application, a confirmation response from the vendor network server, wherein the confirmation response indicates whether the IoT device is connected to the network device and is based on a successful authentication of the network device with the vendor network server using the secure trust mechanism, and
    onboard, by the onboarding application and upon determining that the confirmation response is a positive confirmation response that indicates the IoT device is connected to the network device, the IoT device for participation in the IoT-based system.

18. The computer-readable medium as in claim 17, wherein the confirmation request comprises identifying details for the IoT device, wherein the identifying details comprise at least one of a serial number, a media access control (MAC) address, or associated vendor information.

19. The computer-readable medium as in claim 17, wherein the confirmation request comprises neighboring device information for the network device, wherein the neighboring device information comprises at least one of a serial number, a media access control (MAC) address, or associated vendor information.

20. The computer-readable medium as in claim 17, wherein the IoT device is not configured with a hardware security mechanism for device authentication.

\* \* \* \* \*